United States Patent
Ma et al.

(10) Patent No.: US 11,952,551 B2
(45) Date of Patent: Apr. 9, 2024

(54) GEAR OIL COMPOSITION

(71) Applicant: BASF SE, Ludwigshafen am Rhein (DE)

(72) Inventors: Qinggao Ma, Tarrytown, NY (US); Rene Koschabek, Ludwigshafen am Rhein (DE); Philippe Rabbat, Maplewood, NJ (US); Henrik Heinemann, Ludwigshafen am Rhein (DE); Karolin Monz, Ludwigshafen am Rhein (DE); Frank Rittig, Ludwigshafen am Rhein (DE); Nawid Kashani, Ludwigshafen am Rhein (DE); Markus Scherer, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/414,624

(22) PCT Filed: Dec. 18, 2019

(86) PCT No.: PCT/EP2019/085846
§ 371 (c)(1),
(2) Date: Jun. 16, 2021

(87) PCT Pub. No.: WO2020/127421
PCT Pub. Date: Jun. 25, 2020

(65) Prior Publication Data
US 2022/0064563 A1 Mar. 3, 2022

(30) Foreign Application Priority Data

Dec. 18, 2018 (EP) .................................... 18213266

(51) Int. Cl.
*C10M 169/04* (2006.01)
*C10M 107/00* (2006.01)
*C10M 145/32* (2006.01)
*C10N 20/02* (2006.01)
*C10N 20/04* (2006.01)
*C10N 30/02* (2006.01)
*C10N 40/04* (2006.01)

(52) U.S. Cl.
CPC ...... *C10M 169/041* (2013.01); *C10M 107/00* (2013.01); *C10M 145/32* (2013.01); *C10M 2209/106* (2013.01); *C10N 2020/02* (2013.01); *C10N 2020/04* (2013.01); *C10N 2030/02* (2013.01); *C10N 2040/04* (2013.01)

(58) Field of Classification Search
CPC ............ C10M 169/041; C10M 107/00; C10M 145/32; C10M 2209/106; C10M 107/32; C10M 107/20; C10M 145/34; C10N 2020/02; C10N 2020/04; C10N 2030/02; C10N 2040/04; C10N 2240/04
See application file for complete search history.

(56) References Cited

U.S. PATENT DOCUMENTS

| | | | | |
|---|---|---|---|---|
| 6,455,711 | B1* | 9/2002 | Eller | C08G 65/2657 528/413 |
| 7,041,752 | B2* | 5/2006 | Schlitter | C08G 65/20 526/89 |
| 7,425,524 | B2* | 9/2008 | Haire | C10M 177/00 518/706 |
| 9,296,975 | B2* | 3/2016 | Greaves | C08G 65/2606 |
| 9,556,395 | B2* | 1/2017 | Kashani-Shirazi | C10M 145/32 |
| 9,938,484 | B2* | 4/2018 | Kashani-Shirazi | C10M 169/042 |
| 2011/0237478 | A1* | 9/2011 | Costello | C10M 169/04 508/591 |
| 2016/0024412 | A1* | 1/2016 | Kashani-Shirazi | C10M 129/16 568/672 |
| 2016/0090546 | A1* | 3/2016 | Kashani-Shirazi | C10M 169/042 508/307 |
| 2016/0272916 | A1* | 9/2016 | Kashani-Shirazi | C08G 65/332 |
| 2017/0044459 | A1* | 2/2017 | Goyal | C10M 111/04 |

FOREIGN PATENT DOCUMENTS

| | | |
|---|---|---|
| EP | 3315591 A1 | 5/2018 |
| JP | S57-205423 | 12/1982 |
| JP | 2011190377 | 9/2011 |
| JP | 2016518500 | 6/2016 |
| WO | 2014/139935 A1 | 9/2014 |
| WO | 2014/184062 A1 | 11/2014 |

OTHER PUBLICATIONS

International Preliminary Report on Patentability received for PCT Patent Application No. PCT/EP2019/085846, dated Jul. 1, 2021, 7 pages.
International Search Report and Written Opinion received for PCT Patent Application No. PCT/EP2019/085846, dated Mar. 6, 2020, 7 pages.
European Communication pursuant to Article 94(3) EPC dated Jul. 19, 2023, in European Application No. 19818177.8, 5 pages.

* cited by examiner

*Primary Examiner* — Ellen M McAvoy

(74) *Attorney, Agent, or Firm* — Grüneberg and Myers PLLC

(57) ABSTRACT

The presently claimed invention relates to a gear oil composition having a kinematic viscosity at 40° C. in the range of ≥68 to ≤1000 cSt when measured in accordance with ASTM D445. The gear oil composition is useful as a lubricant in a gear box, especially in a wind turbine gear box.

20 Claims, No Drawings

GEAR OIL COMPOSITION

CROSS-REFERENCE TO RELATED APPLICATIONS

This application is a national stage application (under 35 U.S.C. § 371) of PCT/EP2019/085846, filed Dec. 18, 2019, which claims benefit of European Application No. 18213266.2, filed Dec. 18, 1018, both of which are incorporated herein by reference in their entirety.

FIELD OF THE INVENTION

The presently claimed invention relates to a gear oil composition having a kinematic viscosity at 40° C. in the range of 68 to 1000 cSt, when measured in accordance with ASTM D445.

The gear oil composition is useful as a lubricant in a gear box, especially in a wind turbine gear box.

BACKGROUND OF THE INVENTION

A gear oil composition reduces friction between moving parts such as gears and bearings. It is used as a lubricant in automobiles, wind turbine gear-boxes, compressors and other machinery which are exposed to a variety of environmental and mechanical conditions.

A gear oil composition is expected to provide wear protection over extended period under challenging environmental conditions. Besides, energy efficiency is also an important aspect of the gear oil performance. A low viscosity gear oil composition can be used to save energy; however, the low viscosity composition may form a film of inadequate thickness or lower strength, thereby resulting in friction and wear. This phenomenon is more pronounced under hot conditions that reduce viscosity. For high energy efficiency as well as high wear protection, a gear lubricant composition requires a low friction coefficient and a high film strength.

Further, compatibility of the gear oil compositions with the machine components such as elastomers, seals and paints, is essential.

The energy efficiency of a gear oil is determined by the friction coefficient. The friction coefficient can be measured with several methods like Mini-Traction-Machine (MTM), SRV and 2-disc test rig. The benefit of a MTM is that it allows evaluation of the coefficient of friction as an influence of the slide roll ratio. The slide roll ratio describes the difference of the speeds of a ball and a disc used in the MTM.

The industrial gear oil specifications in Europe are provided by Deutsches Institut fuer Normung (DIN). Further, the OEM (Original Equipment Manufacturer) provide specific approvals/specifications such as Siemens MD (previously known as Flender) and Hansen. The industrial gear oil specifications are continuously upgraded.

WO 2014/139935 A1 describes polyethers that are prepared by alkoxylating polytetrahydrofuran with butylene oxide for use in lubricant compositions and/or for reducing friction in a driveline.

WO 2014/184062 A1 relates to lubricating oil compositions comprising one or more polytetrahydrofurans that are prepared by alkoxylating polytetrahydrofuran with at least one $C_8$-$C_{30}$ epoxy alkane.

US 2017/0044459 A1 axle lubricating oil compositions comprising one or more polytetrahydrofurans that are prepared by alkoxylating polytetrahydrofuran with at least one $C_8$-$C_{30}$ epoxy alkane.

Due to a variety of technical applications and constantly changing industrial gear oil specifications, there is a growing need for a gear oil composition that provides wear protection over a long period and has a high energy efficiency.

Hence, it is an object of the presently claimed invention to provide a gear oil composition hat provides wear protection over a long period and has a high energy efficiency.

SUMMARY OF THE INVENTION

It has surprisingly been found that the use of a gear oil composition having a kinematic viscosity at 40° C. in the range of 68 to 1000 cSt, when measured in accordance with ASTM D445, has beneficial properties, such as superior wear protection over a long period and a high energy efficiency, when used as a lubricant. Further, the gear oil composition has surprisingly low friction coefficient, high film strength and high viscosity index.

Thus, in first aspect, the presently claimed invention is directed to a gear oil composition having a kinematic viscosity at 40° C. in the range of 68 to 1000 cSt, when measured in accordance with ASTM D445, the gear oil composition comprising a) ≥20.0 wt. % to ≤94.0 wt. % of at least one alkoxylated polytetrahydrofuran of the general formula (I) having a kinematic viscosity at 40° C. in the range of 700 to 1300 cSt, as determined in accordance with ASTM D445,

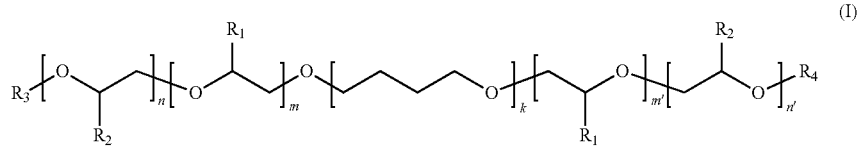

(I)

wherein
m is in the range of ≥1 to ≤50,
m' is in the range of ≥1 to ≤50,
(m+m') is in the range of ≥1 to ≤90
n is in the range of ≥0 to ≤75,
n' is in the range of ≥0 to ≤75,
(n+n') is in the range of ≥0 to ≤90,
k is in the range of ≥2 to ≤30,
$R_1$ denotes an unsubstituted, linear or branched, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$ or $C_{28}$ alkyl,
$R_2$ denotes $CH_2$—$CH_3$, $CH_3$ or H, and
$R_3$ and $R_4$ denote, identical or different, substituted or unsubstituted, linear or branched $C_1$, $C_2$, $C_3$, $C_4$, $C_5$ alkyl or H,
wherein the concatenations denoted by k are distributed to form a block polymeric structure and the concatenations denoted by n, n', m and m' are distributed to form a block polymeric structure or a random polymeric structure; and b) ≥6.0 wt. % to ≤76.0 wt. % of at least one polyalphaolefin having a kinematic viscosity at 40° C. in the range of 16 to 60 cSt as determined in accordance with ASTM D445;

wherein the wt. % are based on the total weight of the gear oil composition.

In a second aspect, the presently claimed invention is directed to a gear box comprising the gear oil composition of the presently claimed invention.

In a third aspect, the presently claimed invention is directed to a method for operating a gear box, the method comprising
(a) contacting the gear oil composition of the presently claimed invention with a set of gears in the gear box; and
(b) operating the gear box.

In a fourth aspect, the presently claimed invention is directed to the use of the gear oil composition of the presently claimed invention as a lubricant in a gear box.

DETAILED DESCRIPTION OF THE INVENTION

Before the present compositions and formulations of the presently claimed invention are described, it is to be understood that this invention is not limited to particular compositions and formulations described, since such compositions and formulation may, of course, vary. It is also to be understood that the terminology used herein is not intended to be limiting, since the scope of the presently claimed invention will be limited only by the appended claims.

If hereinafter a group is defined to comprise at least a certain number of embodiments, this is meant to also encompass a group which preferably consists of these embodiments only. Furthermore, the terms 'first', 'second', 'third' or 'a', 'b', 'c', etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein. In case the terms 'first', 'second', 'third' or '(A)', '(B)' and '(C)' or '(a)', '(b)', '(c)', '(d)', 'i', 'ii' etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

Furthermore, the ranges defined throughout the specification include the end values as well, i.e. a range of 1 to 10 implies that both 1 and 10 are included in the range. For the avoidance of doubt, applicant shall be entitled to any equivalents according to applicable law.

In the following passages, different aspects of the presently claimed invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to 'one embodiment' or 'an embodiment' means that a particular feature, structure or characteristic described in connection with the embodiment is included in at least one embodiment of the presently claimed invention. Thus, appearances of the phrases 'in one embodiment' or 'in an embodiment' in various places throughout this specification are not necessarily all referring to the same embodiment, but may.

Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

Surprisingly, it has been found that the alkoxylated polytetrahydrofuran have a low friction coefficient, high film strength and high viscosity index. As a result, the gear oil composition of the presently claimed invention provides superior wear protection over a long period and a high energy efficiency, when used as a lubricant. Also, the alkoxylated polytetrahydrofurans are miscible with low density polyalphaolefins in various proportions and provide stable compositions.

Hence, in a first aspect, the present disclosure provides a gear oil composition having a kinematic viscosity at 40° C. in the range of ≥68 to ≤1000 cSt, when measured in accordance with ASTM D445. The gear oil composition comprises
a) ≥20.0 wt. % to ≤94.0 wt. % of at least one alkoxylated polytetrahydrofuran of the general formula (I) having a kinematic viscosity at 40° C. in the range of ≥700 to ≤1300 cSt, as determined in accordance with ASTM D445,

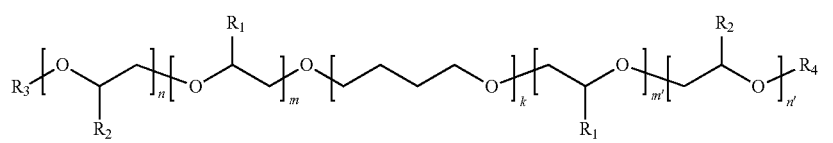

(I)

wherein
m is in the range of ≥1 to ≤50,
m' is in the range of ≥1 to ≤50,
(m+m') is in the range of ≥1 to ≤90
n is in the range of ≥0 to ≤75,
n' is in the range of ≥0 to ≤75,
(n+n') is in the range of ≥0 to ≤90,
k is in the range of ≥2 to ≤30,
$R_1$ denotes an unsubstituted, linear or branched, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$ or $C_{28}$ alkyl,
$R_2$ denotes $CH_2$—$CH_3$, $CH_3$ or H, and $R_3$ and $R_4$ denote, identical or different, substituted or unsubstituted, linear or branched $C_1$, $C_2$, $C_3$, $C_4$, $C_5$ alkyl or H, wherein the concatenations denoted by k are distributed to form a block polymeric structure and the concatenations denoted by n, n', m and m' are distributed to form a block polymeric structure or a random polymeric structure; and b) ≥6.0 wt. % to ≤76.0 wt. % of at least one polyalphaolefin having a kinematic viscosity at 40° C. in the range of ≥16 to ≤60 cSt, as determined in accordance with ASTM D445; wherein the wt. % are based on the total weight of the gear oil composition.

Within the context of the presently claimed invention, the term "alkyl", as used herein, refers to saturated aliphatic groups denoted by a general formula $C_nH_{2n+1}$ and wherein n is the number of carbon atoms 1, 2, 3, 4 etc.

The at least one alkoxylated polytetrahydrofuran of the general formula (I) are miscible with the at least one polyalphaolefin, preferably low viscosity polyalphaolefin. It is found out that when the at least one alkoxylated polytetrahydrofuran and the at least one polyalphaolefin are mixed in various weight ratios such as 10:90, 50:50 and 90:10 the mixtures do not show phase separation after standing for 24 hours at room temperature.

The representative examples of unsubstituted, linear or branched, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$ or $C_{28}$ alkyl include hexyl, heptyl, octyl, nonyl, decyl, undecyl, dodecyl, tridecyl, tetradecyl, pentadecyl, hexadecyl, heptadecyl, octadecyl, nonadecyl, eicosyl, henicosyl, docosyl, tricosyl, tetracosyl, pentacosyl, hexacosyl, heptacosyl, octacosyl, 2-ethyl-hexyl, 2-propyl-heptyl, 2-butyl-octyl, 2-pentyl-nonyl, 2-hexyl-decyl, iso-hexyl, iso-heptyl, iso-octyl, iso-nonyl, iso-decyl, iso-dodecyl, iso-tetradecyl, iso-hexadecyl, iso-octadecyl and iso-eicosyl. The examples of unsubstituted, linear or branched $C_1$, $C_2$, $C_3$, $C_4$, $C_5$ alkyl include methyl, ethyl, propyl, isopropyl, butyl, isobutyl, pentyl, isopentyl and neopentyl.

In a more preferred embodiment of the presently claimed invention, the gear oil composition has a kinematic viscosity at 40° C. in the range of ≥135 to ≤750 cSt, as determined in accordance with ASTM D445.

1) Alkoxylated polytetrahydrofuran

In a preferred embodiment of the presently claimed invention, the at least one alkoxylated polytetrahydrofuran of the general formula (I) is wherein m is in the range of ≥2 to ≤30,
m' is in the range of ≥2 to ≤30,
(m+m') is in the range of ≥4 to ≤60,
n is in the range of ≥2 to ≤40,
n' is in the range of ≥2 to ≤40,
(n+n') is in the range of ≥4 to ≤80, and
k is in the range of ≥6 to ≤20;
$R_1$ denotes an unsubstituted, linear or branched, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$ or $C_{28}$ alkyl,
$R_2$ denotes $CH_2$—$CH_3$, $CH_3$ or H, and
$R_3$ and $R_4$ denote, identical or different, substituted or unsubstituted, linear or branched $C_1$, $C_2$, $C_3$, $C_4$, $C_5$ alkyl or H, wherein the concatenations denoted by k are distributed to form a block polymeric structure and the concatenations denoted by n, n', m and m' are distributed to form a block polymeric structure or a random polymeric structure.

In another preferred embodiment of the presently claimed invention, the at least one alkoxylated polytetrahydrofuran of the general formula (I) is

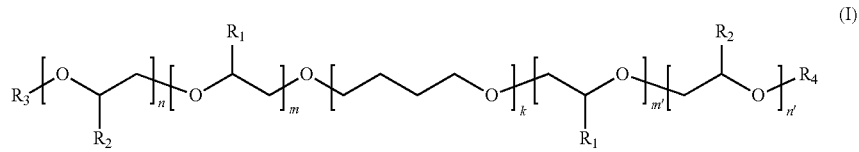

(I)

wherein m is in the range of ≥1 to ≤50,
m' is in the range of ≥1 to ≤50,
(m+m') is in the range of ≥1 to ≤90
n is in the range of ≥0 to ≤75,
n' is in the range of ≥0 to ≤75,
(n+n') is in the range of ≥0 to ≤90,
k is in the range of ≥2 to ≤30,
$R_1$ denotes an unsubstituted, linear or branched, $C_6$, $C_7$, $C_8$, $C_9$, $C_{10}$, $C_{11}$, $C_{12}$, $C_{13}$, $C_{14}$, $C_{15}$, $C_{16}$, $C_{17}$, or $C_{18}$ alkyl,
$R_2$ denotes $CH_2$—$CH_3$, or $CH_3$, and
$R_3$ and $R_4$ denote H,
wherein the concatenations denoted by k are distributed to form a block polymeric structure and the concatenations denoted by n, n', m and m' are distributed to form a block polymeric structure or a random polymeric structure.

In a particularly preferred embodiment of the presently claimed invention, the at least one alkoxylated polytetrahydrofuran of the general formula (I) is

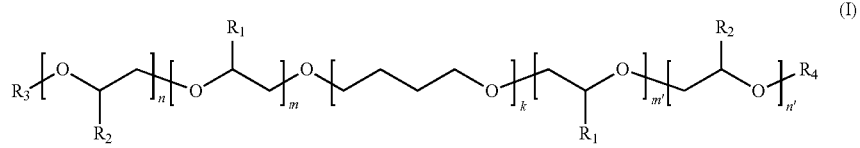

(I)

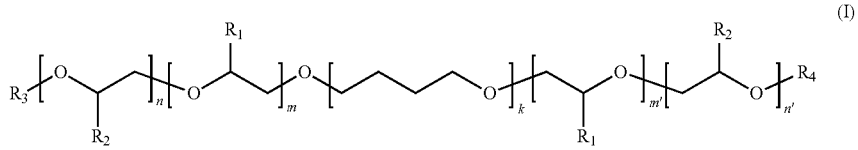

(I)

wherein
k is in the range of ≥10 to ≤15,
(m+m') is in the range of ≥5 to ≤9,
(n+n') is in the range of ≥2 to ≤6,
$R_1$ denotes an unsubstituted, linear or branched, $C_6$, $C_7$, $C_8$, $C_9$, $C_{10}$, $C_{11}$, $C_{12}$, $C_{13}$, $C_{14}$, $C_{15}$, $C_{16}$, $C_{17}$, or $C_{18}$ alkyl,
$R_2$ denotes $CH_2$—$CH_3$, or $CH_3$, and
$R_3$ and $R_4$ denote H,
wherein the concatenations denoted by k are distributed to form a block polymeric structure and the concatenations denoted by n, n', m and m' are distributed to form a block polymeric structure or a random polymeric structure.

In a preferred embodiment of the presently claimed invention, $R_1$ denotes, unsubstituted, linear $C_6$, $C_7$, $C_8$, $C_9$, $C_{10}$, $C_{11}$, $C_{12}$, $C_{13}$, $C_{14}$, $C_{15}$, $C_{16}$, $C_{17}$ or $C_{18}$ alkyl group.

In another preferred embodiment of the presently claimed invention, $R_1$ denotes, identical, unsubstituted, linear $C_8$, $C_9$, $C_{10}$, $C_{11}$, $C_{12}$, $C_{13}$, or $C_{14}$ alkyl.

In a particularly preferred embodiment of the presently claimed invention, $R_1$ is $C_{12}$ alkyl.

In a preferred embodiment of the presently claimed invention, $R_2$ denotes $CH_2$—$CH_3$ or $CH_3$.

In a preferred embodiment of the presently claimed invention, $R_3$ and $R_4$ are, independent of each other, H, methyl or ethyl.

In a particularly preferred embodiment of the presently claimed invention, $R_3$ and $R_4$ are H.

In a preferred embodiment of the presently claimed invention, the at least one alkoxylated polytetrahydrofuran of general formula (I) has a weight average molecular weight in the range of ≥500 to ≤20000 g/mol, more preferably in the range of ≥2000 to ≤10000 g/mol, and most preferably in the range of ≥2000 to ≤7000 g/mol, even more preferably in the range of ≥4000 to ≤7000 g/mol as determined in accordance with DIN 55672-1.

In a preferred embodiment of the presently claimed invention, the at least one alkoxylated polytetrahydrofuran of the general formula (I) has a kinematic viscosity at 40° C. in the range of ≥900 to ≤1300 cSt, and more preferably in the range of ≥1000 to ≤1300 cSt, as determined in accordance with ASTM D445.

In a preferred embodiment of the presently claimed invention, the at least one alkoxylated polytetrahydrofuran of the general formula (I) has a viscosity index in the range of ≥200 to ≤300, and more preferably in the range of ≥200 to ≤250, as determined in accordance with ASTM D2270.

The at least one alkoxylated polytetrahydrofuran is synthesized by reacting at least one polytetrahydrofuran block polymer with at least one $C_8$-$C_{30}$ epoxide ($R_1$=$C_6$-$C_{28}$ alkyl) and optionally at least one epoxide selected from the group consisting of ethylene oxide ($R_2$=H), propylene oxide ($R_2$=$CH_3$) and butylene oxide ($R_2$=$CH_2CH_3$) in the presence of at least one catalyst. In case at least one epoxide selected from the group ethylene oxide ($R_2$=H), propylene oxide ($R_2$=$CH_3$) and butylene oxide ($R_2$=$CH_2CH_3$) is used, the at least one $C_8$-$C_{30}$ epoxide ($R_1$=$C_6$-$C_{28}$ alkyl) and the at least one epoxide selected from the group consisting of ethylene oxide ($R_2$=H), propylene oxide ($R_2$=$CH_3$) and butylene oxide ($R_2$=$CH_2CH_3$) can either be added as a mixture of epoxides to obtain a random copolymer or in portions, wherein each portion contains a different epoxide to obtain a block copolymer.

In a preferred embodiment of the presently claimed invention, the polytetrahydrofuran block polymer is selected from the group consisting of pTHF-1000 having a weight average molecular weight of 1000 g/mol and pTHF-650 having a weight average molecular weight of 650 g/mol, as determined in accordance with DIN 55672-1.

The representative examples of the at least one $C_8$-$C_{30}$ epoxide ($R_1$=$C_6$-$C_{28}$ alkyl) are, but not limited to, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane, 1,2-epoxyicosane, 1,2-epoxyhenicosane, 1,2-epoxydoicosane, 1,2-epoxytricosane, 1,2-epoxytetraicosane, 1,2-epoxypentaicosane, 1,2-epoxyhexaicosane, 1,2-epoxyheptaicosane, 1,2-epoxyoctaicosane, 1,2-epoxynonaicosane, and 1,2-epoxidtriacontane.

In a preferred embodiment, the at least one $C_8$-$C_{30}$ epoxide is a $C_{12}$ epoxide ($R_1$=$C_{10}$ alkyl).

The representative examples of $C_2$ to $C_7$ epoxides are, but not limited to, ethylene oxide, propylene oxide, 1,2-epoxybutane, 1,2-epoxypentane, 1,2-epoxyhexane and 1,2-epoxyheptane.

2) Polyalphaolefin (Pao)

In a preferred embodiment of the presently claimed invention, the at least one polyalphaolefin has a kinematic viscosity at 40° C. in the range of ≥16 to ≤55 cSt, as determined in accordance with ASTM D445.

The at least one polyalphaolefin comprises a low molecular weight hydrogenated polymer or oligomer of alphaolefins selected from the group consisting of $C_2$ to $C_{32}$ alphaolefins;
preferably $C_8$ to $C_{16}$ alphaolefins.

Within the context of the presently claimed invention, the term "alphaolefin", as used herein, refers to an acylic alkene (olefin), including a linear or a branched alkene denoted by a general formula $C_nH_{2n}$, and wherein n is the number of carbon atoms 1, 2, 3, 4 etc. that are distinguished by having a double bond at the primary or alpha (α) position.

The representative examples of $C_2$ to $C_{32}$ alphaolefins are, but not limited to, ethylene, 1-propene, 1-butene, 1-pentene, 1-hexene, 1-heptane, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-icosene, 1-henicosene, 1-docosene, 1-tricosene, 1-tetracosene, 1-pentacosene, 1-hexacosene, 1-heptacosene, 1-octacosene, 1-nonacosene, 1-triacontene, 1-hentriacontene and 1-dotriacontene.

In a more preferred embodiment, the at least one polyalphaolefin is selected from the group consisting of 1-octene, 1-decene, and 1-dodecene.

Different classes of polyolefins are also referred to as PAO 4, PAO 5, PAO 6, PAO 7 or PAO 8 based on their viscosity. For instance, PAO 6 refers to the class of polyolefins which typically has viscosity in the range of 6 mm²/s at 100° C.

In a more preferred embodiment, the polyalphaolefin is selected from the group consisting of PAO 5, PAO 6 and PAO 7.

In a most preferred embodiment of the presently claimed invention, the polyalphaolefin is PAO 6 or PAO 7.

3) Additives

The gear oil composition of the presently claimed invention optionally comprises additives.

The additives that are as used in the presently claimed invention may be included in an additive package.

The additive package that may be used in the presently claimed invention are considered mixtures of additives that are typically used in gear oil compositions in limited amounts for mechanically, physically or chemically stabilizing the lubricant compositions while special performance characteristics can be further established or improved by the individual or combined presence of such selected additives.

However, the individual components contained in the additive packages and/or the compounds further defined in the presently claimed invention as so-called performance additives include a larger number of different types of additives including dispersants, metal deactivators, detergents, extreme pressure agents (typically boron- and/or sulfur- and/or phosphorus-containing), anti-wear additives, antioxidants (such as hindered phenols, aminic antioxidants or molybdenum compounds), ester, polyester, corrosion inhibitors, demulsifier, anti-foam additives, pour point depressants, friction modifiers and mixtures thereof.

In a more preferred embodiment of the presently claimed invention, the gear oil composition of the presently claimed invention comprises at least one additive component selected from the group consisting of anti-wear additive, antioxidant, polyester, corrosion inhibitor, demulsifier and anti-foam additive.

Anti-Wear Additive

The gear oil composition of the presently claimed invention further preferably comprises at least one anti-wear additive selected from the group consisting of trialkylphosphates, triarylphosphates, dialkyldithiophosphate esters and trialkylthiophosphates.

In a more preferred embodiment of the presently claimed invention, the at least one anti-wear additive is a mixture of tris(methylphenyl)phosphate and an amine salt of dialkyl dithiophosphate ester.

In a preferred embodiment of the presently claimed invention, the at least one anti-wear additive is present in an amount in the range of ≥0.1 wt. % to ≤3.0 wt. %, more preferably in the range of ≥1 wt. % to ≤3.0 wt. %, based on the total weight of the gear oil composition.

Antioxidant

The gear oil composition further preferably comprises at least one antioxidant selected from the group consisting of aminic antioxidants and phenolic antioxidants.

In one embodiment, the performance additive in the gear oil composition according to the present invention may further include at least one antioxidant. Antioxidants retard the oxidative degradation of base stocks during service. Such degradation may result in deposits on metal surfaces, the presence of sludge, or a viscosity increase in the lubricant. One skilled in the art knows a wide variety of oxidation inhibitors that are useful in lubricating gear oil compositions.

Useful antioxidants include hindered phenols. These phenolic antioxidants may be ashless (metal-free) phenolic compounds or neutral or basic metal salts of certain phenolic compounds. Typical phenolic antioxidant compounds are the hindered phenolics which are the ones which contain a sterically hindered hydroxyl group, and these include those derivatives of dihydroxy aryl compounds in which the hydroxyl groups are in the o- or p-position to each other. Typical phenolic antioxidants include the hindered phenols substituted with C6+ alkyl groups and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; and 2-methyl-6-t-butyl-4-dodecyl phenol. Other useful hindered mono-phenolic antioxidants may include for example hindered 2,6-di-alkyl-phenolic propionic ester derivatives. Bis-phenolic antioxidants may also be advantageously used in combination with the instant invention. Examples of ortho-coupled phenols include: 2,2∝-bis(4-heptyl-6-t-butyl-phenol); 2,2'-bis(4-octyl-6-t-butyl-phenol); and 2,2'-bis(4-dodecyl-6-t-butyl-phenol). Para-coupled bisphenols include for example 4,4'-bis(2,6-di-t-butyl phenol) and 4,4'-methylene-bis(2,6-di-t-butyl phenol).

Non-phenolic oxidation inhibitors which may be used include aromatic amine antioxidants and these may be used either as such or in combination with phenolics. Typical examples of non-phenolic antioxidants include: alkylated and non-alkylated aromatic amines such as aromatic monoamines of the formula $R_8R_9R_{10}N$, where $R_8$ is an aliphatic, aromatic or substituted aromatic group, $R_9$ is an aromatic or a substituted aromatic group, and $R_{10}$ is H, alkyl, aryl or $R_{11}S(O)_xR_{12}$, where $R_{11}$ is an alkylene, alkenylene, or aralkylene group, $R_{12}$ is a higher alkyl group, or an alkenyl, aryl, or alkaryl group, and x is 0, 1 or 2. The aliphatic group $R_8$ may contain from 1 to about 20 carbon atoms, and preferably contains from about 6 to 12 carbon atoms. The aliphatic group is a saturated aliphatic group. Preferably, both $R_8$ and $R_9$ are aromatic or substituted aromatic groups, and the aromatic group may be a fused ring aromatic group such as naphthyl. Aromatic groups $R_8$ and $R_9$ may be joined together with other groups such as S.

Typical aromatic amines antioxidants have alkyl substituent groups of at least about 6 carbon atoms. Examples of aliphatic groups include hexyl, heptyl, octyl, nonyl, and decyl. Generally, the aliphatic groups will not contain more than about 14 carbon atoms. The general types of amine antioxidants useful in the present compositions include diphenylamines, phenyl naphthylamines, phenothiazines, imidodibenzyls and diphenyl phenylene diamines. Mixtures of two or more aromatic amines are also useful. Polymeric amine antioxidants can also be used. Particular examples of aromatic amine antioxidants useful in the present invention include: p,p'-dioctyldiphenylamine; t-octylphenyl-alpha-naphthylamine; butylated diphenylamine; phenyl-alpha naphthylamine; and p-octylphenyl-alpha-naphthylamine. Sulfurized alkyl phenols and alkali or alkaline earth metal salts thereof also are useful antioxidants.

In a preferred embodiment of the presently claimed invention, the at least one antioxidant is present in an amount in the range of ≥0.1 wt. % to ≤1.0 wt. %, based on the total weight of the gear oil composition.

Ester and Polyester

The gear oil composition further preferably comprises at least one polyester selected from the group consisting of ester obtainable by reacting trimethylol propane and adipic acid; ester obtainable by reacting trimethylol propane and $C_8$-$C_{10}$ monocarboxylic acid; tris(methyl)phenyl fatty acid esters, di-(2-propylheptyl)-adipate, di-isodecyl adipate, diisotridecyl adipate and diisononyladipate. The gear oil composition further preferably comprises at least one ester selected from the group consisting of methyl oleate. In a more preferred embodiment of the presently claimed invention, the at least one polyester is ester obtainable by reacting trimethylolpropane fatty acid with $C_8$-$C_{10}$ monocarboxylic acid, which is commercially available as Synative® ES 2925 (from BASF SE).

Corrosion Inhibitor

The gear oil composition further preferably comprises at least one corrosion inhibitor.

The corrosion inhibitors may be selected from oxygen-, nitrogen-, sulfur-, and phosphorus-containing materials, and may include metal-containing compounds (salts, organometallics, etc.) and nonmetal-containing or ashless materials. Corrosion inhibitors may include, but are not limited to, additive types such as, for example, hydrocarbyl-, aryl-, alkyl-, arylalkyl-, and alkylaryl-versions of detergents (neutral, overbased), sulfonates, phenates, salicylates, alcoholates, carboxylates, salixarates, phosphites, phosphates, thiophosphates, amines, amine salts, amine phosphoric acid salts, amine sulfonic acid salts, alkoxylated amines, etheramines, polyetheramines, amides, imides, azoles, diazoles, triazoles, benzotriazoles, benzothiadoles, mercaptobenzothiazoles, tolyltriazoles (TTZ-type), heterocyclic amines, heterocyclic-sulfides, thiazoles, thiadiazoles, mercaptothiadiazoles, dimercaptothiadiazoles (DMTD-type), imidazoles, benzimidazoles, dithiobenzimidazoles, imidazolines, oxazolines, Mannich reactions products, glycidyl ethers, anhydrides, carbamates, thiocarbamates, dithiocarbamates, polyglycols, etc., or mixtures thereof.

Corrosion inhibitors are used to reduce the degradation of metallic parts that are in contact with the gear oil composition. Suitable corrosion inhibitors include thiadiazoles. Aromatic triazoles, such as tolyltriazole, are suitable corrosion inhibitors for non-ferrous metals, such as copper.

In a more preferred embodiment of the presently claimed invention, the at least one corrosion inhibitor is present in an amount in the range of ≥0.1 wt. % to ≤0.5 wt. %, based on the total weight of the gear oil composition.

Demulsifier

The gear oil composition further preferably comprises at least one demulsifier selected from the group consisting of trialkyl phosphates, and various polymers and copolymers of ethylene glycol, ethylene oxide and propylene oxide.

In a preferred embodiment of the presently claimed invention, the at least one emulsifier is present in an amount in the range of ≥0.01 wt. % to ≤0.20 wt. %, based on the total weight of the gear oil composition.

Anti-Foam Additive Anti-foam additives may also advantageously be added to the gear oil compositions according to the present invention. These agents retard the formation of stable foams. Silicones and organic polymers are typical anti-foam additives. For example, polysiloxanes, such as silicon oil, or polydimethylsiloxane, provide foam inhibiting properties. Further anti-foam additives include copolymers of ethyl acrylate and 2-ethylhexyl acrylate and optionally vinyl acetate.

In a preferred embodiment of the presently claimed invention, the at least one anti-foam additive is present in an amount in the range of ≥0.05 wt. % to ≤0.50 wt. %, based on the total weight of the gear oil composition.

Extreme Pressure Additives (Ep Additives)

The gear oil composition further preferably comprises at least one extreme pressure additive selected from the group consisting of sulfurized olefins, sulfurized organic compounds, polysulfides and sulfur-containing compounds.

In a preferred embodiment, the sulfurized olefin is derived from olefins selected from the group consisting of propylene, isobutylene and pentene.

In a preferred embodiment, the sulfurized organic compound is selected from the group consisting of sulfurized methyl ester of oleic acid, sulfurized alkylphenol, sulfurized dipentene, sulfurized terpene, sulfurized Diels-Alder adduct and alkyl sulphenyl N'N-dialkyl dithiocarbamate.

In a preferred embodiment, the polysulfide is selected from the group consisting of benzyldisulfide, bis-(chlorobenzyl) disulfide, dibutyl tetrasulfide, and di-tertiary butyl polysulfide.

In a preferred embodiment, the sulfur-containing compound is selected from dimercaptothiadiazole, or its derivative, or mixtures thereof. Representative examples of the dimercaptothiadiazole include 2,5-dimercapto-1,3,4-thiadiazole or a hydrocarbyl-substituted 2,5-dimercapto-1,3,4-thiadiazole, or oligomers thereof. Suitable 2,5-dimercapto-1,3,4-thiadiazole derived compounds include 2,5-bis(tert-nonyldithio)-1,3,4-thiadiazole and 2-tert-nonyldithio-5-mercapto-1,3,4-thiadiazole. The number of carbon atoms on the hydrocarbyl substituents of the hydrocarbyl-substituted 2,5-dimercapto-1,3,4-thiadiazole typically include 1 to 30, or 2 to 20, or 3 to 16.

Pour Point Depressants

The gear oil composition further preferably comprises at least one pour point depressant selected from the group consisting of esters of maleic anhydride-styrene, polymethacrylates, polyacrylates and polyacrylamides.

Representative examples of additive packs for gear oil composition of the presently claimed invention are Hitec 307, Hitec 315, Hitec 317, Hitec 350, Irgalube ML 605 A, Lubrizol IG93MA 506, Lubrizol IG93MA 5064, Lubrizol IG93MA 5091, Vanlube 0902, RC 9330, RC 9410, RC 9451 and NA-LUBE BL-1208.

In a more preferred embodiment of the presently claimed invention, the gear oil composition comprises ≥20.0 wt. % to ≤94.0 wt. % of at least one alkoxylated polytetrahydrofuran;

≥6.0 wt. % to ≤76.0 wt. % of at least one polyalphaolefin; and

≥0.5 wt. % to ≤6.0 wt. % of at least one additive, wherein the wt. % are based on the total weight of the gear oil composition, wherein the weight percentages of all components add up to 100.

In a preferred embodiment of the presently claimed invention, the at least one additive is selected from the group consisting of anti-wear additive, antioxidant, polyester, corrosion inhibitor, emulsifier and anti-foam additive.

In a most preferred embodiment of the presently claimed invention, the gear oil composition comprises at least one alkoxylated polytetrahydrofuran, at least one polyalphaolefin and at least one additive in the amounts provided in Table 1.

TABLE 1

Gear oil composition

| Component | 1 | 2 | 3 | 4 | 5 |
|---|---|---|---|---|---|
| at least one alkoxylated polytetrahydrofuran | ≥20.0 to ≤90.0 wt % | ≥25.0 to ≤85.0 wt. % | ≥30.0 to ≤80.0 wt. % | ≥40.0 to ≤70.0 wt. % | 50 wt. % |
| at least one polyalphaolefin | ≥6.0 to ≤76.0 wt. % | ≥10.0 to ≤80.0 wt. % | ≥15.0 to ≤75.0 wt. % | ≥25.0 to ≤65.0 wt. % | 46 wt. % |
| at least one additive | ≥0.5 to ≤6.0 wt. % | ≥1.0 to ≤5.0 wt. % | ≥2.0 to ≤4.5 wt. % | ≥3.0 to ≤4.5 wt. % | 4 wt % |

Preferably the weight percentages of all components of the gear oil composition add up to 100.

In a preferred embodiment, a wear scar of less than 200 μm, more preferably less than 100 μm is preferably obtained using the gear oil composition. The film strength is determined by High frequency friction reciprocating (HFRR) testing by wear scar test at 52° C. using a 100 g load.

In a preferred embodiment, the coefficient of friction of the gear oil composition of the presently claimed invention is in the range of 0.015 to 0.018, determined by a mini-traction machine at 100° C. and 1 GPa at 25% slide roll ratio.

In a second aspect, the presently claimed invention is directed to a gear box comprising the gear oil composition.

One preferred use of the gear oil composition of the presently claimed invention is in a wind turbine gear box. The wind turbine gear box is characterized by a high gear ratio of approximately 1:100 as it links a high load and low-speed shaft rotated by the wind turbine blades rotor at approximately 8 to 20 rotations per minute (rpm), to one or more high speed shafts that drive the generator at approximately 1000 to 1800 rpm, the rotational speed required by most generators to produce electricity. The gears and bearings in the wind turbine experience high stress due to the high gear ratio.

In a more preferred embodiment, the presently claimed invention is directed to a wind turbine comprising the gear box.

The preferred embodiments as described above also apply to the uses and methods as outlined in the following passages.

In a third aspect, the presently claimed invention is directed to a method for operating a gear box. The method comprises the following steps.
  a) The gear oil composition of the presently claimed invention is contacted with a set of gears in the gear box.
  b) The gear box is operated.

In a preferred embodiment of the presently claimed invention, the method passes the FAG FE8 bearing test in accordance with DIN 51819-3.

In a fourth aspect, the presently claimed invention is directed to use of the gear oil composition as a lubricant in a gear box.

The presently claimed invention offers one or more of the following advantages:
  a. The gear oil composition of the presently claimed invention has a high film strength. The high film strength of the gear oil composition is one of the factors responsible for its high wear protection.
  b. Due to a low friction coefficient, the gear oil composition has a high energy efficiency.
  c. The gear oil composition provides excellent gear box protection. The capability of the gear oil composition for the gear box protection is evaluated using well-known gear oil tests such as FZG scuffing load carrying capacity test in accordance with method ISO 14635-1, FAG FE-8 bearing test in accordance with DIN51819-3, compatibility with elastomer shaft seals in accordance with FB 7311008, demulsibility test in accordance with ISO 6614 and 3-phase FVA-54 micropitting protection test. The gear oil composition displays high load carry capacity, bearing protection and micropitting protection.
  d. The gear oil composition has a high thermal stability and oxidation stability. The composition displays high oxidation control, rust prevention, and foam control. As a result, the gear oil composition of the presently claimed invention have long useful life.

Having generally described the invention, a further understanding can be obtained by reference to certain specific examples which are provided herein for the purpose of illustration only, and are not intended to be limiting unless otherwise specified.

EXAMPLES

The presently claimed invention is further illustrated in combination with the following examples. These examples are provided to exemplify the presently claimed invention, but are not intended to restrict the scope of the presently claimed invention in any way.

Materials

Alkoxylated polytetrahydrofuran was prepared by reacting PolyTHF® 1000 or PolyTHF 650 with epoxide/s. PolyTHF® 1000 or PolyTHF® 650 available from BASF SE, Ludwigshafen/Rhine, Germany.

Polyalphaolefin 6 (PAO 6) having a kinematic viscosity at 40° C. of 30.8 cSt is available from ExxonMobil.

Methods $M_n$=number average molecular weight, determined according to DIN 55672-1 and referred to Polystyrene calibration standard.

$M_w$=weight average molecular weight, determined according to DIN 55672-1 and referred to Polystyrene calibration standard.

PD=polydispersity, determined according to DIN 55672-1.

Kv=kinematic viscosity, determined according to ISO3104 or ASTM D 445.

VI=viscosity Index, determined according to ISO2909 or ASTM D 2270.

Density was determined according to ASTM D4052.

TAN=total acid number, determined according to DIN 51558-1 or ASTM D 664.

The pour point was determined according to ISO3016 or ASTM D97.

The flash point was determined according to ISO2592 or ASTM D 92 COC.

Water content was determined according to DIN51777-2 or ASTM-D6304.

Rust prevention was evaluated in accordance with ISO 7120 (ASTM D665A and D665B).

Foam control was evaluated in accordance with ISO 6247 (ASTM D892).

Demulsibility was evaluated in accordance with ISO 6614 or ASTM D1401.

Oxidation control was evaluated in accordance with ISO 4263-4 (ASTM D2893).

FZG Scuffing test was carried out in accordance with ISO14635 (DIN 51534)

FAG FE8 bearing test was carried out in accordance with DIN51819-3.

Flender oil foam test was carried out in accordance with IS012152.

Compatibility with elastomer shaft seals was evaluated in accordance with FB 7311008.

Friction Coefficient Measurement

The gear oil compositions were tested in the MTM (Mini Traction Machine) instrument using the traction test mode.

In a typical MTM configuration, a ¼" (19.05 mm) diameter steel ball (AISI 52100) was loaded and rotated against the flat surface of a rotating disk (AISI 52100). The disc was held in a bath containing a test lubricant so that the contact between the ball and the flat surface were fully immersed. The ball shaft was aligned with respect to the disk so as to prevent spin in the contact and the slide-roll ratio was controlled independently by driving both the ball and the disk with separate motors.

The friction coefficient was measured at a constant mean speed (U) over a range of slide roll ratios (SRR) to give the traction curve.

SRR=sliding U/mean entrainment U
=2 $(U_1-U_2)/(U_1+U_2)$ in which $U_1$ and $U_2$ are the ball and disc speeds respectively.

The disc and ball used for the experiments were made of steel (AISI 52100), with a hardness of 750 HV and Ra<0.02 μm. The diameter was 46.0 mm and 19.0 mm for the disc and the ball, respectively. The tractions curves were run with 1.00 GPa contact pressure, 4 m/s mean speed and 70° C. temperature. The slide-roll ratio (SRR) was varied from 0 to 25% and the friction coefficient was measured.

Preparation of the Gear Oil Compositions

Preparation of Alkoxylated Polytetrahydrofuran

Example 1

PolyTHF 650 with 20 Equivalents of $C_{12}$ Epoxide

A steel reactor (1.5 l) was loaded with polytetrahydrofuran ($M_w$ 650 g/mol) (0.2 mol, 130 g), and 3.4 g KO$^t$Bu was mixed and the reactor was purged with nitrogen. The reactor was heated under vacuum (10 mbar) and heated to 140° C. for 0.25 h. Then again nitrogen was loaded. At a pressure of 2 bar, 50 g $C_{12}$ epoxide was brought in dropwise at 140° C. 686 g $C_{12}$ epoxide of total (736 g; 4.0 mol) was added during 10 h at 140° C. and under pressure of 6 bar.

Yield: 874 g, quantitative (theor.: 866 g) OHZ: 28.2 mg KOH/g, $M_w$: 4923 g/mol and $M_n$: 4517 g/mol, polydispersity: 1.09.

Example 2

PolyTHF 650 with 12 Equivalents of $C_{12}$ Epoxide and 20 Equivalents of Butylene Oxide (Block) A steel reactor (1.5 l) was loaded with polytetrahydrofuran ($M_w$ 650 g/mol) (0.2 mol, 130 g), and 3.4 g KO$^t$Bu was mixed and the reactor was purged with nitrogen. The reactor was heated under vacuum (10 mbar) and heated to 140° C. for 0.25 h. Then again nitrogen was loaded. At a pressure of 2 bar 50 g $C_{12}$ epoxide was brought in dropwise at 140° C. 390 g $C_{12}$ epoxide of total (441 g; 2.4 mol) was added during 5 h at 140° C. and under pressure of 6 bar. Then butylene oxide (288 g, 4.0 mol) was added within 4 h at 140° C. The reactor was stirred for 10 h at 140° C. and cooled to 80° C. The product was stripped by nitrogen. Then the product was discharged and mixed with Ambosol® (30 g) and mixed on a rotary evaporator at 80° C. The purified product was obtained by filtration in a pressure strainer (Filtrations media: Seitz 900).

Yield: 866 g, quantitative (theor.: 859 g) OHZ: 30.1 mg KOH/g, $M_w$: 4602 g/mol and $M_n$: 3861 g/mol, polydispersity: 1.19.

Example 3

PolyTHF 650 with 12 Equivalents of $C_{12}$ Epoxide and 20 Butylene Oxide (Random)

A steel reactor (5 l) was loaded with polytetrahydrofuran ($M_w$ 650 g/mol) (0.732 mol, 476 g), and KO$^t$Bu (12.6 g) was mixed and the reactor was purged with nitrogen. At a pressure of 2 bar a mixture of butylene oxide and $C_{12}$ epoxide (14.64 mol, 1104 g butylene oxide; 8.8 mol, 1617 g $C_{12}$ epoxide) was brought in dropwise during 30 h at 140° C. and under pressure of 6 bar. The reactor was stirred for 10 h at 140° C. and cooled to 80° C. The reactor was cooled to 80° C. and the product was stripped by nitrogen. Then the product was discharged and mixed with Ambosol® (60 g) and mixed on a rotary evaporator at 80° C. The purified product was obtained by filtration in a pressure strainer (Filtrations media: Seitz 900). Yield: 3077 g (96%) (Th.: 3200 g), OHZ: 31.4 mg KOH/g, $M_w$: 4650 g/mol and $M_n$: 4720 g/mol, polydispersity: 1.42.

Example 4

PolyTHF 650 with 12 Equivalents of $C_{12}$ Epoxide and 20 Equivalents of Propylene Oxide (Random)

A steel reactor (1.5 l) was loaded with polytetrahydrofuran ($M_w$ 650 g/mol) (0.2 mol, 130 g), and KO$^t$Bu (3.21 g) was mixed and the reactor was purged with nitrogen. At a pressure of 2 bar a mixture of propylene oxide and $C_{12}$ epoxide (4.0 mol, 232 g PO; 2.4 mol, 441 g $C_{12}$ epoxide) was brought in dropwise during 7 h at 140° C. and under pressure of 6 bar. The reactor was stirred for 10 h at 140° C. The reactor was cooled to 80° C. and the product was stripped by nitrogen. Then the product was discharged and mixed with Ambosol® (60 g) and mixed on a rotary evaporator at 80° C. The purified product was obtained by filtration in a pressure strainer (Filtrations media: Seitz 900).

Yield: 800 g (quantitative) (Th.: 803 g), OHZ: 30.8 mg KOH/g, $M_w$: 5074 g/mol and $M_n$: 4660 g/mol, polydispersity: 1.09.

Example 5

PolyTHF 1000 with 18 Equivalents of $C_{12}$ Epoxide and 30 Equivalents of Butylene Oxide (Random)

A steel reactor (1.5 l) was loaded with polytetrahydrofuran ($M_w$ 1000 g/mol) (0.1 mol, 100 g), and KO$^t$Bu (2.59 g) was mixed and the reactor was purged with nitrogen. At a pressure of 2 bar a mixture of butylene oxide and $C_{12}$ epoxide (3.0 mol, 216 g butylene oxide; 1.8 mol, 331 g $C_{12}$ epoxide) was brought in dropwise during 5 h at 140° C. and under pressure of 6 bar. The reactor was stirred for 10 h at 140° C. and cooled to 80° C. The reactor was cooled to 80° C. and the product was stripped by nitrogen. Then the product was discharged and mixed with Ambosol® (60 g) and mixed on a rotary evaporator at 80° C. The purified product was obtained by filtration in a pressure strainer (Filtrations media: Seitz 900).

Yield: 661 g (quantitative) (Th.: 647 g), OHZ: 24.7 mg KOH/g, $M_w$: 5667 g/mol and $M_n$: 4551 g/mol, polydispersity: 1.24.

Example 6

PolyTHF 1000 with 36 Equivalents of $C_{12}$ Epoxide and 60 Equivalents of Butylene Oxide (Random)

A steel reactor (1.5 l) was loaded with polytetrahydrofuran ($M_w$ 1000 g/mol) (0.1 mol, 100 g), and KO$^t$Bu (4.78 g) was mixed and the reactor was purged with nitrogen. At a pressure of 2 bar a mixture of butylene oxide and $C_{12}$ epoxide (6.0 mol, 432 g butylene oxide; 3.6 mol, 662 g $C_{12}$ epoxide) was brought in dropwise during 11 h at 140° C. and under pressure of 6 bar. The reactor was stirred for 10 h at 140° C. and cooled to 80° C. The reactor was cooled to 80° C. and the product was stripped by nitrogen. Then the product was discharged and mixed with Ambosol® (60 g) and mixed on a rotary evaporator at 80° C. The purified product was obtained by filtration in a pressure strainer (Filtrations media: Seitz 900).

Yield: 1236 g (quantitative) (Th.: 1194 g), OHZ: 9.4 mg KOH/g, $M_w$: 6629 g/mol and $M_n$: 5204 g/mol, polydispersity: 1.27.

Example 7

PolyTHF 650 with 4 Equivalents of $C_{12}$ Epoxide and 40 Equivalents of Butylene Oxide (Random)

Procedure followed was similar to the procedure mentioned in Example 3.

OHZ: 27 mg KOH/g, $M_w$: 5369 g/mol and $M_n$: 4872 g/mol, polydispersity: 1.10.

Preparation of Gear Oil Composition

Four gear oil compositions containing varying amounts of alkoxylated polytetrahydrofuran and polyalphaolefin are provided in Table 2 as examples 1-4. In these examples, the total amount of the alkoxylated polytetrahydrofuran and the polyalphaolefin is 96.0 wt. % and the total amount of additives is 4.0 wt. %.

TABLE 2

GEAR OIL COMPOSITIONS

| Sr | Component | Example 1 | Example 2 | Example 3 | Example 4 |
|----|-----------|-----------|-----------|-----------|-----------|
| 1 | Polyalphaolefin | 41.35 | 33.40 | 22.40 | 10.40 |
| 2 | alkoxylated polytetrahydrofuran | 54.55 | 62.50 | 73.50 | 85.50 |
| 3 | Additives | 4.0 | 4.0 | 4.0 | 4.0 |

The physical properties of the gear oil compositions 1-4 are summarized in Table 3.

TABLE 3

Physical properties of the gear oil compositions 1-4

| Property | Method | Example 1 | Example 2 | Example 3 | Example 4 |
|----------|--------|-----------|-----------|-----------|-----------|
| Appearance at 25° C. | — | clear | clear | clear | clear |
| AGMA viscosity grade | — | 5 | 6 | 7 | 8 |
| Kinematic viscosity Kv40, cSt | ISO3104 or ASTM D445 | 237.35 | 338.96 | 452.43 | 678.63 |
| Kinematic viscosity Kv100, cSt | ISO3104 or ASTM D445 | 35.55 | 48.18 | 60.99 | 85.00 |
| Viscosity index VI | ISO2909 or ASTM D2270 | 199.2 | 204.7 | 207.7 | 213.0 |
| Density, g/ml @ 15° C. | ASTM D4052 | 0.8852 | 0.8955 | 0.9078 | 0.9212 |
| Pour point, ° C. | ISO3016 or ASTM D97 | −48 | −45 | −45 | −43 |
| Flash point, ° C. | ISO2592 or ASTM D92 COC | >200 | >200 | >200 | >200 |
| TAN, mg KOH/g | DIN 51558-1 or ASTM D664 | 0.91 | 0.921 | 0.959 | 0.9 |
| Water, wt. % | DIN 51777-2 or ASTM D6304 | <0.05% | <0.05% | <0.05% | <0.05% |

It is observed from Table 3 that the gear oil compositions of examples 1-4 are clear in appearance and have high viscosity index.

The performance of the examples 1-4 above was evaluated in key bench tests, which are part of well-known gear oil specifications. These tests include rust test, oxidation test, FE-8 bearing Test, and revised DIN specification 51517-3. Additionally, these gear oil compositions were evaluated in the 3-phase FVA-54 Micropitting Test. The results are summarized in Table 4.

TABLE 4

PERFORMANCE TESTS

| Performance test | Method | Example 1 | Example 2 | Example 3 | Example 4 |
|------------------|--------|-----------|-----------|-----------|-----------|
| Rust Test | ISO7120 ASTM D665A (24 hrs) | PASS | PASS | PASS | PASS |
| Rust Test | ISO7120 ASTM D665B (24 hrs) | PASS | PASS | PASS | PASS |
| Foam | ISO6247 Seq. I, ASTM D892, 0/10 min | 0/0 | 0/0 | 0/0 | 0/0 |
| Foam | ISO6247 Seq. I, ASTM D892, 0/10 min | 0/0 | 0/0 | 0/0 | 0/0 |
| Foam | ISO6247 Seq. I, ASTM D892, 0/10 min | 0/0 | 0/0 | 0/0 | 0/0 |
| Demulsibility, separation time, min, 82° C. | ISO6614 or ASTM D1401 | PASS | PASS | PASS | PASS |
| U.S. Steel oxidation test, D2893, 121° C., 312 hrs, % Kv100 increase and precipitation number, ml | ISO4263-4 or ASTM D2893 | <2.5<br><0.05 | <3.0<br><0.05 | <3.5<br><0.05 | <4.0<br><0.05 |

TABLE 4-continued

PERFORMANCE TESTS

| Performance test | Method | Example 1 | Example 2 | Example 3 | Example 4 |
|---|---|---|---|---|---|
| FZG Scuffing | ISO14635 DIN 51534, A/8.3/90, failure load stage | >14 | >14 | >14 | >14 |
| FAG FE8, D7,5/80-80, weight loss, roller bearing, mg | DIN51819-3 | <1 | <1 | <1 | <1 |
| FAG FE8, D7,5/80-80, weight loss, cage, mg | DIN51819-3 | <47 | <47 | <47 | <47 |
| Compatibility with internal coating - P22-Mäder, M20-Mäder and EP 3152-Rickert | — | Compatible | Compatible | Compatible | Compatible |
| Compatibility with liquid sealing compound - Loctite 128068 | — | Compatible | Compatible | Compatible | Compatible |
| Flender oil foam test | ISO12152 | PASS | PASS | PASS | PASS |
| FVA micropitting test FVA 54 VII @ 90° C. oil injection temperature, failure load stage | — | 10 | 10 | 10 | 10 |
| Compatibility with elastomer shaft seals - Static test | FB 7311008 | PASS | PASS | PASS | PASS |
| Compatibility with elastomer shaft seals - Dynamic test | FB 7311008 | PASS | PASS | PASS | PASS |
| Compatibility with outer coating, PU5240, PU6240/6340, PU5045, PU6240/6340 HC, EP4251 | — | PASS | PASS | PASS | PASS |

As shown in Table 4, the gear oil compositions of examples 1-4 pass the tests for wear protection, oxidation control, rust prevention, static and dynamic seal compatibility, demulsibility, and foam control.

The invention claimed is:

1. A gear oil composition having a kinematic viscosity at 40° C. in the range of ≥135 to ≤750 cSt when measured in accordance with ASTM D445, the gear oil composition comprising
a) ≥2.0.0 wt. % to ≤94.0 wt. % of at least one alkoxylated polytetrahydrofuran of the general formula (I) having a kinematic viscosity at 40° C. in the range of ≥700 to ≤1300 cSt, as determined in accordance with ASTM D445,

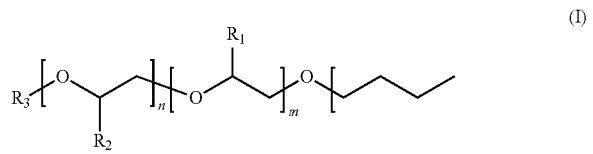

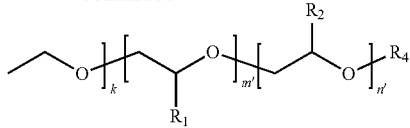

wherein
m is in the range of ≥1 to ≤50,
m' is in the range of ≥1 to ≤50,
(m+m') is in the range of ≥1 to ≤90
n is in the range of ≥0 to ≤75,
n' is in the range of ≥0 to ≤75,
(n+n') is in the range of ≥0 to ≤90,
k is in the range of ≥2 to ≤30,
$R_1$ denotes an unsubstituted, linear or branched, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$ or $C_{28}$ alkyl,
$R_2$ denotes $CH_2-CH_3$, $CH_3$ or H, and
$R_3$ and $R_4$ denote, identical or different, substituted or unsubstituted, linear or branched $C_1$, $C_2$, $C_3$, $C_4$, $C_5$ alkyl or H,
wherein the concatenations denoted by k are distributed to form a block polymeric structure and the concatenations denoted by n, n', m and m' are distributed to form a block polymeric structure or a random polymeric structure; and
b) ≥6.0 wt. % to ≤76.0 wt. % of at least one polyalphaolefin having a kinematic viscosity at 40° C. in the range of ≥16 to ≤60 cSt as determined in accordance with ASTM D445; wherein the wt. % are based on the total weight of the gear oil composition.

2. The gear oil composition according to claim 1, wherein
m is in the range of ≥2 to ≤30,
m' is in the range of ≥2 to ≤30,
(m+m') is in the range of ≥4 to ≤60
n is in the range of ≥2 to ≤40,
n' is in the range of ≥2 to ≤40,
(n+n') is in the range of ≥4 to ≤80,
k is in the range of ≥6 to ≤20.

3. The gear oil composition according to claim 1, wherein
k is in the range of ≥10 to ≤15,
(m+m') is in the range of ≥5 to ≤9, and
(n+n') is in the range of ≥2 to ≤6.

4. The gear oil composition according to claim 1, wherein $R_1$ denotes identical, unsubstituted, linear $C_6$, $C_7$, Cs, $C_9$, Cm, $C_{11}$, $C_{12}$, $C_{13}$, $C_{14}$, $C_{15}$, $C_{16}$, $C_{17}$ or $C_{18}$ alkyl.

5. The gear oil composition according to claim 1, wherein $R_2$ denotes $CH_2-CH_3$ or $CH_3$.

6. The gear oil composition according to claim 1, wherein $R_3$ and $R_4$ denote H.

7. The gear oil composition according to claim 1, wherein the at least one alkoxylated polytetrahydrofuran of general formula (I) has a weight average molecular weight in the range of ≥4000 to ≤7000 g/mol as determined in accordance with DIN 55672-1.

8. The gear oil composition according to claim 1, wherein the at least one alkoxylated polytetrahydrofuran of the general formula (I) has a kinematic viscosity at 40° C. in the range of ≥1000 to ≤1200 cSt, as determined in accordance with ASTM D455.

9. The gear oil composition according to claim 1, wherein the at least one polyalphaolefin has a kinematic viscosity at 40° C. in the range of ≥16 to ≤55 cSt as determined in accordance with ASTM D445.

10. The gear oil composition according to claim 1, wherein the polyalphaolefin is selected from the group consisting of PAO 5, PAO 6 and PAO 7.

11. The gear oil composition according to claim 1, further comprising at least one additive selected from the group consisting of dispersants, metal deactivators, detergents, extreme pressure agents, anti-wear additives, antioxidants, polyesters, corrosion inhibitors, demulsifier, anti-foam additives, pour point depressants, friction modifiers and mixtures thereof.

12. The gear oil composition according to claim 11, wherein the at least one additive is present in an amount of ≥0.5 wt. % to ≤6.0 wt. %, based on the total weight of the gear oil composition.

13. The gear oil composition according to claim 11, wherein the polyesters are selected from the group consisting of methyl oleate; ester obtainable by reacting trimethylol propane and adipic acid; ester obtainable by reacting trimethylol propane and $C_8$-$C_{10}$ monocarboxylic acid; di-(2-propylheptyl)-adipate, di-isodecyl adipate, diisotridecyl adipate and diisononyladipate.

14. The gear oil composition according to claim 13, wherein the polyesters are present in an amount in the range of ≥0.05 wt. % to ≤0.25 wt. %, based on the total weight of the gear oil composition.

15. The gear oil composition according to claim 1, wherein the gear oil composition passes the FAG FE8 bearing test in accordance with DIN 51819-3.

16. A gear box comprising a gear oil composition according to claim 1.

17. The gear oil composition according to claim 1, wherein the at least one alkoxylated polytetrahydrofuran is present in an amount in the range of ≥50 wt. % to ≤94.0 wt. % based on the total weight of the gear oil composition.

18. The gear oil composition according to claim 1, wherein the at least one alkoxylated polytetrahydrofuran is present in an amount in the range of ≥54.55 wt. % to ≤85.50 wt. % based on the total weight of the gear oil composition.

19. The gear oil composition according to claim 1, wherein the gear oil composition does not include a polyester.

20. A method for operating a gear box, the method comprising (a) contacting the gear oil composition according to claim 19 with a set of gears in the gear box; and (b) operating the gear box.

* * * * *